United States Patent [19]

Schweiger

[11] 4,082,609
[45] Apr. 4, 1978

[54] CONTROL ROD FOR GAS-COOLED NUCLEAR REACTORS

[75] Inventor: Fritz Schweiger, Hagen, Germany

[73] Assignee: Hochtemperatur-Kernkraftwerk GmbH, Gemeinsames Europaisches Unternehmen, Uentrop, Unna, Germany

[21] Appl. No.: 680,924

[22] Filed: Apr. 28, 1976

Related U.S. Application Data

[63] Continuation-in-part of Ser. No. 592,882, Jul. 3, 1975, abandoned, which is a continuation of Ser. No. 517,630, Oct. 24, 1974, abandoned, which is a continuation of Ser. No. 391,022, Aug. 23, 1973, abandoned, which is a continuation of Ser. No. 233,052, Mar. 13, 1972, abandoned.

[30] Foreign Application Priority Data

Mar. 16, 1971 Germany .............................. 2112471

[51] Int. Cl.² ................................................ G21C 7/10
[52] U.S. Cl. ................................ 176/86 R; 176/36 R; 176/58 PB
[58] Field of Search ............................ 176/34–36, 176/86, 58 PB

[56] References Cited

U.S. PATENT DOCUMENTS

| 3,089,838 | 5/1963 | Paget ................................. 176/86 R |
| 3,121,045 | 2/1964 | Harris et al. ....................... 176/86 R |
| 3,519,536 | 7/1970 | Rausch .............................. 176/86 R |

FOREIGN PATENT DOCUMENTS

| 1,322,339 | 2/1963 | France ................................ 176/86 R |
| 881,853 | 11/1961 | United Kingdom .............. 176/86 R |
| 1,102,235 | 2/1968 | United Kingdom .............. 176/86 R |

*Primary Examiner*—Harvey E. Behrend
*Attorney, Agent, or Firm*—Toren, McGeady and Stanger

[57] ABSTRACT

In a gas cooled pebble bed reactor the poison part of a control rod which has upper and lower portions and an interior cooling fluid channel is movable into and away from a bed of spherical fuel elements; the improvement includes a control rod security device which facilitates removal of the fractured control rod when the control rod breaks between its end portions. The security device includes an oblong member which is located and extends within the cooling channel and is slack relative to the control rod, a device attached to one end of the oblong member for preventing a fall of the oblong member into the lower portion of the control rod, and a device attached to the other end of the oblong member for preventing portions of the control rod from falling into the bed of fuel elements upon a fracture of the control rod between its end portions. The oblong member is sufficiently strong so as to hold the upper and lower end portions together upon the fracture of the control rod, so that its upper and lower end portions then remain interconnected through the security device.

8 Claims, 6 Drawing Figures

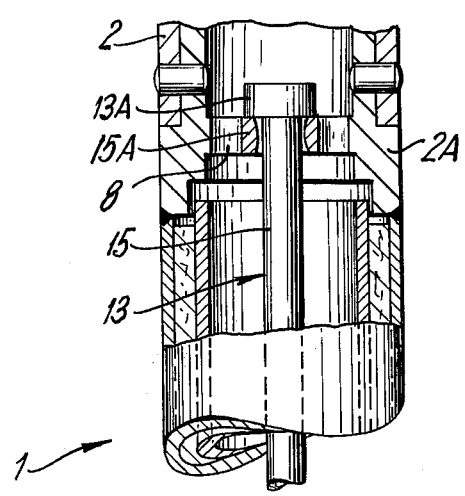
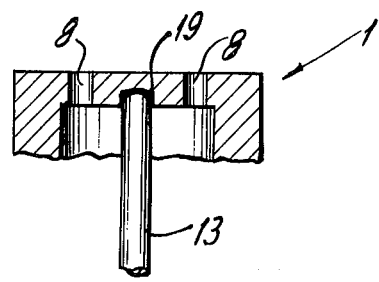
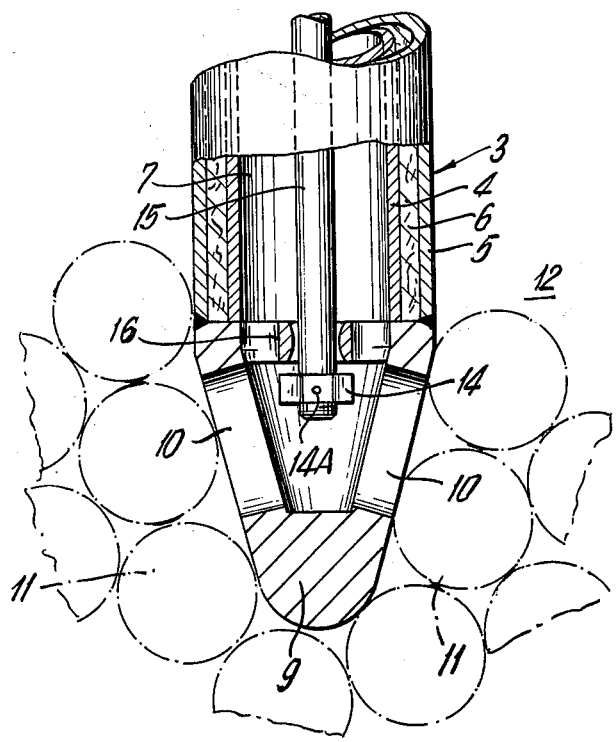
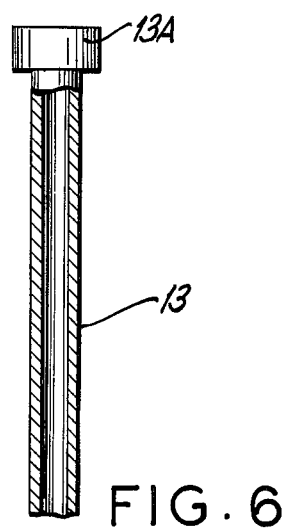
FIG. 5
FIG. 6
FIG. 3

CONTROL ROD FOR GAS-COOLED NUCLEAR REACTORS

CROSS-REFERENCE TO PRIOR APPLICATIONS

This is a continuation-in-part application of pending prior continuation application Ser. No. 592,882 filed on July 3, 1975, which in turn was a continuation of Ser. No. 517,630, filed on Oct. 24, 1974, which was in turn a continuation application of Ser. No. 391,022 filed on Aug. 23, 1973, which was in turn a continuation application of pending prior application Ser. No. 233,052, filed on Mar. 13, 1972, for a CONTROL ROD FOR GAS-COOLED NUCLEAR REACTORS (of all which is now abandoned).

SUMMARY OF THE INVENTION

The invention relates to a control rod for gas-cooled pebble bed nuclear reactors, i.e. of the kind employing spherical fuel elements.

In reactors of this kind, the control rods are driven, preferably pneumatically, into the charge of spherical fuel elements forming the core of the reactor. During the penetration of the rod into the reaction charge, the rod is subjected to sideways thrusts to bend it. Bending stresses also arise after the rod has been inserted into the charge, whenever individual reaction spheres are removed from the lower end of the core through an outlet opening. When this occurs, the remaining spheres flow along flow paths towards the central outlet opening, subjecting the inserted control rod to bending stresses.

During reactor operation, the steel control rods are subjected to the action of high velocity neutrons. A neutron dose of the order of $10^{21}$ nvt is enough to make the control rod appreciably brittle, reducing its bending stength and giving rise to a risk of the rod breaking when it is being inserted into the charge and during removal of reaction spheres through the outlet opening of the reactor. Rod breakage has been a serious matter, involving time-consuming and costly operations for removing the broken rod from the core. Attempts have been made to remedy this problem by variously providing warning or monitoring systems which indicate fracture of the control rod, a telescopic arrangement of absorber elements inducing contraction of the control rod, or mechanisms which attempt to prevent or negate the application of bending moments to the control rod. All these mechanisms have, however, proved to be relatively expensive, and while mitigating or reducing the occurrance of rod breakages, have generally not permitted the application of a neutron dose in a nuclear reactor to the maximum theoretically obtainable value.

In view of these serious difficulties, it has hitherto been the practice in the operation of nuclear reactors to limit the neutron dose to a value far below the theoretically permissible value. As a result, the reactors have been operated at neutron doses below their theoretical capabilities.

Furthermore, the operative reliability of the reactor, and consequently also its safety depends in the last analysis on the susceptibility to trouble of its components, and the ability to exchange damaged components safely and rapidly. This applies especially to activated or irradiated parts, and when determining part or component replacement, the influence of direct radiation by fuel elements or by the core, the activity of the cooling gas and surface contamination of the components, e.g. by neutron radiation, must all be taken into account.

It is, therefore, an object of the present invention to minimize these difficulties by providing a control rod which can be easily extracted from the core material even after the rod has been broken.

It is another object of the present invention to provide for a relatively rapid replacement of any broken control rod; it is still another object of the invention to permit an application of a neutron dose to the reactor which is not limited by the ability of the rod to withstand bending moments and other stresses operatively exerted thereon.

According to the invention, an absorber rod which is also removable from the core in the ruptured state, is provided with a safety device or insert in the interior thereof and secured or freely guided on the bottom and/or the top end of the rod. The insert, according to the invention, causes the rod parts to remain connected to each other even in the case of rupture of the rod, so that the broken rod can be easily removed from the core. This mechanism is more practicable than attempting to strengthen the core rod itself, which may result in an unwieldy and expensive construction, or to monitor the core rod for fracture or incipient fracture, which requires that limits be placed on the neutron dosage at which the reactor can be operated.

The safety insert or security device can take the form of a slack cable. The advantage of this is that when the rod breaks, the cable being itself flexible, is not subjected to bending stresses which might damage the attachments of the cable to the rod. Although the cable does acquire a certain degree of brittleness due to the neutron flux, it nevertheless retains sufficient tensile strength under all operating conditions, including rod fracture. The safety device is preferably made of a heat-resistant material which does not weaken excessively under the influence of the high temperatures prevailing in the core. Instead of a cable, the safety or security device can, if desired take the form of a rod or a tube, suitably attached to, or guided in the control rod.

The safety or security device is preferably situated in a cooling channel which extends axially in the interior of the control rod. This has the advantage that the safety device remains comparatively cool and the material of the safety device is not excessively weakened by temperature effects.

In certain applications, depending on the rod dimensions, construction and method of use, it can be desirable to arrange for replacement of certain parts of the rod. The safety device may, therefore, be secured detachably to the ends of the rod. Alternatively, it may be attached permanently, for example, by welding, to the cool upper end and/or the hot lower end of the control rod.

BRIEF DESCRIPTION OF THE DRAWING

The present invention will be better understood with reference to the accompanying drawing in which:

FIG. 3 shows enlarged portions of two sections of the control rod shown within the dot-dash-dot circles of FIG. 2;

FIG. 5 is an alternate form of attachment of the safety device to the control rod, shown in partial longitudinal cross-section; and FIG. 6 shows an alternate form of the guide means of the safety device illustrated in FIG. 3.

DETAILED DESCRIPTION OF THE INVENTION

Figure 1:
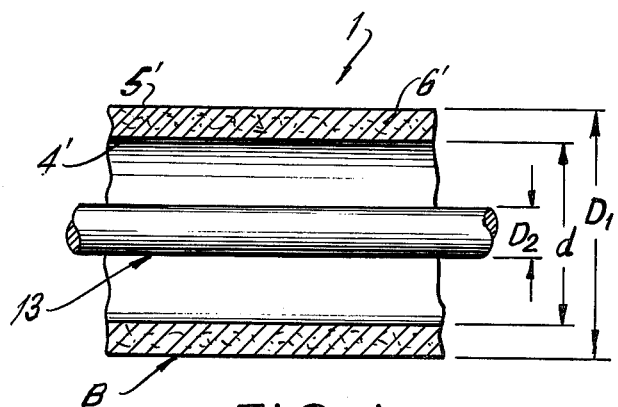
FIG. 1 is a schematic simplified fragmentary longitudinal cross-section through the control rod and the safety device.

For an understanding of the invention it is essential to appreciate that bending forces acting on a combination of a rod or tube surrounded by two concentric cylinders or tubes can produce considerably higher stresses in the outer concentric cylinder than in the central, or "catcher" rod. Referring now to FIG. 1, and denoting the mean deflection $f$ for the inner concentric tube having a diameter $d$ as $f_{it}$, the mean deflection of the outer concentric tube having a diameter $D_1$ as $f_{ot}$, and the mean deflection of the catcher rod having a diameter $D_2$ as $f_c$, in the most unfavorable case $$f_{it} = f_{ot} = f_c \tag{1}$$

the maximum stresses appearing on the outer fibers of the tubular or rod elements involved being obtainable from $$f = \frac{P \cdot l^3}{E \cdot I \cdot 3} \tag{2}$$

and $$\sigma_{max} = \frac{M_b}{W} = \frac{P \cdot l}{W} \tag{3}$$

where
$f$ = deflection
$p$ = applied transverse force
$l$ = bending length (= maximum rod or tube length)
$E$ = modulus of elasticity
$W$ = moment of resistance
$I$ = cross-sectional or area moment of inertia
$M_b$ = bending moment or torque
$\sigma$ = bending stress Combining equations (2) and (3) leads to $$f = \frac{\sigma_{max} \cdot W \cdot l^2}{E \cdot I \cdot 3} \tag{4}$$

and $$\sigma_{max} = \frac{f \cdot E \cdot 3 \cdot I}{l^2 \cdot W} \tag{5}$$

Using the most pessimistic assumption of equal deflections and equal material of the rod and the concentric tubes, i.e. $E_{it} = E_{ot} = E_c$, the bending stresses $\sigma_{max}$ are only a function of the quotient $I/W$, i.e. the ratio of the area moment of inertia to the moment of resistance. These assumptions are pessimistic since the catcher rod can, by an appropriate free guidance means, be subject to a smaller deflection than the concentric tubes and can additionally be made of a higher grade, or better material.

For the problem posed the actual dimensions of the inner and outer concentric tubes are irrelevant, since the bending stresses prevailing will naturally be absorbed or taken up jointly by both cross-sections of the tubes. If the permissible stress is exceeded in the outermost fiber of the outer concentric tube, that tube ruptures. This, in turn, leads to a reduction of the supporting cross-section, so that the resistance moment of the inner tube cannot absorb the entire stresses, causing the inner tube to rupture also. Alternately, the entire resistance moment could be obtained from a correspondingly thicker outer tube alone, so that consideration of the stresses prevailing in the inner tube could be eliminated from a strictly mechanical point of view. For this reason the maximum stresses in the outer fibers of the outer tube and of the catcher rod need to be considered only for a satisfactory operation of the latter.

These stresses are given by:

$$\frac{\sigma_{ot_{max}}}{\sigma_{c_{max}}} = \frac{I_{ot} \cdot W_c}{W_{ot} \cdot I_c} \tag{6}$$

where $$I_{ot} = I_{tube} = \frac{\pi}{64} (D_1^4 - d^4) \tag{7}$$

$$W_{ot} = W_{tube} = \frac{\pi}{32} \frac{(D_1^4 - d^4)}{D_1} \tag{8}$$

$$I_c = I_{rod} = \frac{\pi}{64} D_2^4 \tag{9}$$

and $$W_c = W_{rod} = \frac{\pi}{32} D_2^3 \tag{10}$$

so that $$\frac{\sigma_{ot_{max}}}{\sigma_{c_{max}}} = \frac{D_1}{D_2} \tag{11}$$

Taking $D_1$ as 105 mm, and $D_2$ as 19.8 mm it follows that $$\frac{\sigma_{ot_{max}}}{\sigma_{c_{max}}} = \frac{105}{19.8} = 5.3$$

This means that the stress applied to the catcher rod is lower by a factor of 5.3 than that applied to the outer tube, so that the catcher rod remains undamaged if the absorber rod ruptures, thus holding the rod fragments together, as intended. It will be understood that the catcher rod does not reduce the stresses occurring in the outer or inner tubes, but simply causes the fractured parts of the catcher rod to stay together upon fracture for subsequent easy removal from the reactor.

In order to avoid misunderstanding, it should be appreciated that FIG. 1 is a diagrammatic showing whose wall structure corresponds essentially to that of FIG. 4 to be described below. Thus, the cross-hatched sleeve structure generally indicated by B comprises — as in FIG. 4 — twin tubes 4' and 5' with interposed shielding material 6'. Thus $d$ indicates the inner diameter of the inner tube 4 while $D$ refers to the outer diameter of the outer tube 5.

Figure 2:
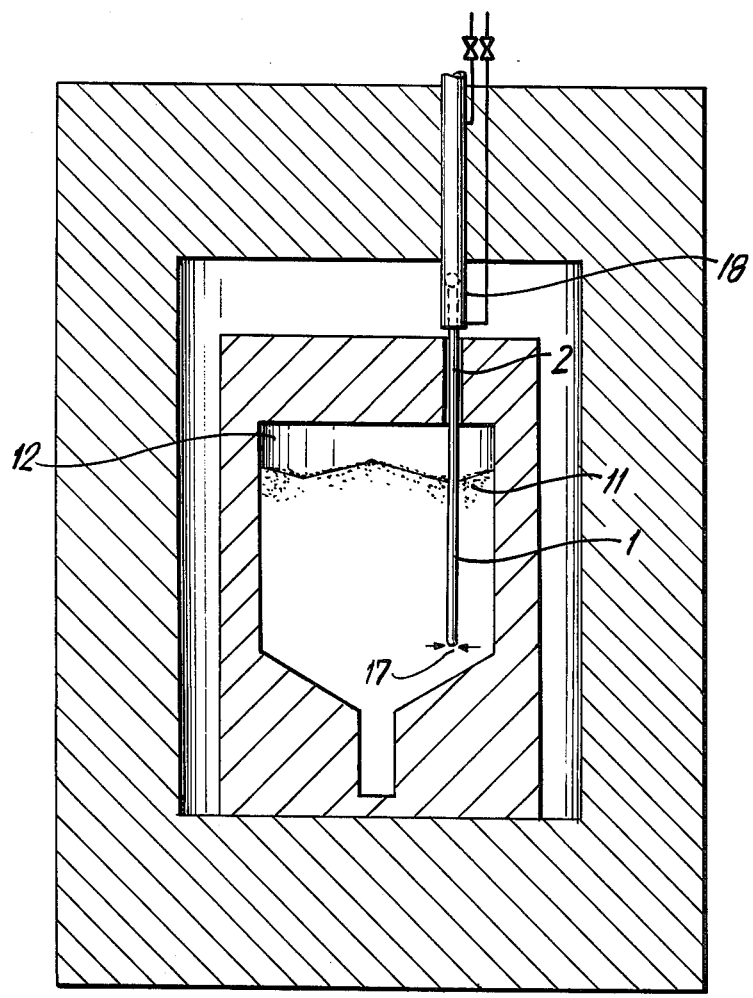
FIG. 2 is a diagrammatic longitudinal cross-section through the reactor showing one control rod.

Referring now to FIG. 2, which shows a diagrammatic representation of a gas-cooled pebble bed nuclear reactor in longitudinal cross-section, it will be seen that a push rod 2 — only one push rod 2 being shown for the sake of clarity in FIG. 2 — drives an attached absorber rod 1 having a poison part by means of a piston 18 into a core 12. In the process of being driven into the core, which consists of a multiplicity of fuel element spheres 11, the absorber or control rod 1 may be subjected to a being primarily thermal neutrons which produce an (n, alpha - ) effect. The degree of brittleness cannot be measured in operation, i.e. without disassembly of the rods which have a life expectancy of about 30 years. The thermal neutron dose can only be estimated on the basis of the operating time of the rods. For the safety insert 13, however, the thermal neutron dose during the intended operating time is practically zero, and independent of the insertion period of the rods 1 in the core 12 under neutron bombardment as a result of the shielding material 6 interposed between the tubes 4 and 5. The rapid neutron flux also renders the material of the safety insert 13 brittle, but the latter brittleness is, however, insignificant compared to the damage of the material of the outer tube 4 by the thermal neutrons, particularly since the outer tube 4 can become heated to temperatures exceeding 500° C in case of trouble; this results in a diffusion of the helium from the granular boundaries.

It will thus be appreciated that the thermal flux reduces the rupture expansion capability of the tubes 4 and 5, loading of the tubes being less important than expansion. It is necessary to cool the control rod 1 because the fuel element or reaction spheres 11 have surface temperatures of the order of 1000° C. At this temperature the control rod 1 would deform at least plastically unless cooled. It will be observed that the safety insert or cable 13 passes through the cooling channel 7 and cannot therefore be heated to a dangerous degree. The rods enter the cluster of fuel elements or pebble bed directly, which represents an advance in the state-of-the-art; hitherto the rods had moved in channels without any bending stress having been exerted thereon, but naturally exerted a correspondingly smaller control action on the pebble bed.

FIG. 5 shows an alternate form of attachment of the safety device 13 to the control rod 1, i.e. by welding; the welding joint 19 causes the safety device 13 to be firmly attached to the control rod 1.

FIG. 6 shows an alternate form of the guide rod 15 of the safety device 13 of FIG. 3, i.e. in the form of a tube in lieu of a solid rod.

A typical material used for the inner and outer tubes 4 and 5 is X8CrNiMoNb 16 16 DIN Nr. 1.4891~AISI 316, which is specially treated by 40% cold-forming or strain-hardening for 1 hour at a temperature of 820° C of recrystallization annealing. A typical percentage content of key elements shows the material to contain 0.1%C, 0.6% Si, 1.5% Mn, 16.5% Cr, 2% Mo, 16.5% Ni and 1% Nb. Strength values are as follows: at a temperature of:

|  | 20 | 600° C |
|---|---|---|
| $\sigma$ 0.2 | 47 | 30kp/mm$^2$ |

A typical material used for the safety insert 13 is X5NiCrTi26 15 DIN Nr. 1,4980 ≙ A 286. A typical percentage of key elements shows the material to contain 0.08%C, 1% Si, 2% Mn, 15% Cr, 1.5% Mo, 26% Ni, 0.5% V, 0.35% Al, 2.3% Ti, 0.01% B. Strength values are as follows: at a temperature of

|  | 20 | 600° C |
|---|---|---|
| $\sigma$ 0.2 | 65 | 46Kp/mm$^2$ |
| $\sigma$ B | 95 – 120 | " |
| $\delta_B$ | 15 | % |

The stress rupture strength is as follows:

At a temperature of 600° C and 45 kp/mm$^2$ the life is 1000 hours; if the kp/mm$^2$ value is reduced to 31, the life is 10000 hours.

It is worthwhile to describe the action and operation of the safety insert when a control rod 1 ruptures and to explain in particular why the safety insert 13 does not snap upon rupture of the control rod 1.

As has already been stated, the control rod 1, when intact, is subjected to bending stresses which are absorbed by the tubes 4 and 5. The safety insert 13, which may be either a safety cable, or a safety rod is not thereby subjected to any stress, apart from its insignificant own weight. This is so since a safety cable lacks any bending stiffness, and because a safety rod such as guide rod 15, is able to pass freely through collars 15A and 16. Upon a significant bending of the control rod 1 the safety insert 13 could also be bent by being pressed into contact with the inner tube 4 and thus be subjected to a bending stress. This bending stress, to which the safety rod 13 is subjected, remains, however, smaller by a factor within the range of at least 5 and 6 than the stress exerted on the tubes 4 and/or 5, and in fact remains in practice with a degree of probability bordering on certainly within a range of 10 to 15. It will thus be appreciated that the safety insert 13 does not contribute to any significant degree towards the increase of the rigidity of the control rod 1.

The safety insert 13 does not, therefore, perform any operative function when the control rod 1 is intact. Only upon fracture of the tubes 4 and 5 does the role of the safety insert 13 come into play.

The bending stress of the control rod 1, and its surrounding tubes 4 and 5 are reduced instantaneously to zero by a rupture of the control rod, so that the fractured parts would fall apart without a safety insert or security device according to the invention. It is, however, the safety insert or security device 13 which holds the fractured parts of the control rod 1 together. In the embodiment of the safety device shown in FIG. 3, for example, the upset head 13A, while preventing a fall of its guide rod 15 into the recess of the tip 9 by normally abutting against the guide collar 15A, permits the safety device to be slack within the control rod 1, i.e. it is not stressed as long as the control rod 1 remains intact. Upon fracture of the control rod 1 the threaded nut 14 catches, however, the lower fractured portion of the control rod 1, abutting against the collar 16, and thus preventing its fall into the pebble bed reactor; the fractured portions of the control rod 1 can, therefore, be safely withdrawn from the core 12 in an upward direction. The purely tensile stress to which the safety insert 13 is subjected during withdrawal from the core amounts to approximately 5000 kp, inclusive of its own weight, and is due to the pressure of the surrounding reaction spheres 11. Calculations show that the stress of 5000 kp inclusive of the safety insert weight is approximately one half of the permissible stress at $\sigma = 0.2$ at 600° C, so that the safety insert fulfills its function completely. This safety factor is, in fact, somewhat larger than 2, since the safety insert 13 will not be deflected as strongly as the outer tube 5 due to its free travel through collars 15A and 16.

It will, therefore, be seen that a safety insert according to the present invention permits the withdrawal of broken control rods 1 from the core 12 in a safe manner and without interrupting the operation of the nuclear reactor for any appreciable time. The safety insert 13 can consist of either a safety cable or a safety rod, the lateral deflection, which is diagrammatically shown as the horizontal distance 17.

The total number of spherical fuel elements 11 in the reactor may, for example, be 675,000. In full load operation 3,700 fuel elements may be withdrawn daily, for example, through a non-illustrated central exhaust pipe below the core 12 by means of gravity, and the same number may be added by means of a non-illustrated pneumatic system disposed above the core 12.

The mean velocity of flow of the spherical fuel elements is thus very low. Experiments have shown that the ratio of the velocity of flow of the fuel element balls on the outer surface of the cylindrical core to the velocity of flow of the balls in the central axis of the core is 1:30 to 1:10, depending on the design of the surface of a non-illustrated lateral reflector, so that the velocity of flow of the balls assumes a very low value in the outer regions. The balls follow the lines of flux and terminate finally all in the central exhaust pipe.

It will be readily understandable that a rod in the vertical axis of the core is not subjected to any deflection by the flow of the balls, but that the deflection increases the farther the control rod is removed from the central axis.

The local velocities of flow and the course of the lines of flux themselves are influenced, in addition to the geometric shape of the core bottom, by the number of control rods 1 that are inserted at the same time into the core 12 in the sense that, with the outer rods 1 fully inserted, the velocities of flow drop on the surface of the lateral reflector. The friction of the balls 11 against each other and against the rods 1 themselves also plays a role. The friction depends on the temperature, which in turn is not constant, in view of different operating states; a generally valid rule for the velocity of the fuel element balls 11 cannot therefore be derived. The lines of flux and the flow velocities can only be measured by experiment, i.e. by the operation of a few marked balls 11. The marking is effected, for example, by electromagnetic means or by special neutron absorbers in individual balls 11, which permit selective identification of these test balls or elements upon their removal from the core.

It is certainly possible that, upon fracture of a control rod 1, a broken end of the rod may align itself in a theoretically unfavorable case in the direction of the lines of flux of the adjacent fuel element balls 11. This unfavorable case is, however, never achieved in reality, because the transverse force applied to by the balls 11 on the rod 1 after the latter has fractured tends very rapidly toward zero. The very low flow velocities of the balls 11 provide sufficient time to cut off the circulation of the balls by a non-illustrated system reporting the rupture of the rods 1.

In practical full-load operation the core rods 1 are, however, fully withdrawn from the core. The reactor control is effected solely by the absorber rods 1, which are introduced into vertical bores of the non-illustrated lateral reflector. The core rods 1 thus serve preferably only to cut off the reactor completely. In normal full-load operation the rods 1 are thus not inserted into the core, and are, therefore, not subjected to any bending stress. After the core rods have been inserted for full-load shutdown, the ball circulation remains shut off, so that the rods 1 cannot be deflected by the flow of the balls 1.

In the first operational core, and also after long shutdown intervals of any core it will be necessary, however, to leave some rods, e.g. up to 12 core rods out of a total of 42 core rods, in the core 12 until the full neutron contamination or poisoning is built up in operation, and to drive the rods into the core by hand in small steps corresponding to the buildup of the neutron poisoning or contamination by means of a second non-illustrated pneumatic drive operating in tandem with the first drive. For reasons of power distribution, rods are preferably reserved for this purpose which are close to the central vertical axis of the core 12. In this state the ball circulation will have been activated. But care must then be taken that these centrally disposed rods are less deflected and thus subjected to a smaller bending stress than the rods previously considered, which are arranged in the outer zone of the core. But it is also possible to use some outside rods for this purpose, which are then subjected to a greater bending stress than the interior rods.

Enlarged view of the two portions of FIG. 2 within dot-dash-dot circles are shown in FIG. 3. It will be seen that the absorber or control rod 1 is double-walled, coupled to the push-or upper thrust-rod 2 and merges with a lower absorber portion 3. The absorber portion 3 has two concentrically arranged tubes 4 and 5 enclosing between them an absorber material 6. This is material suitable for absorbing neutrons which penetrate into it. The outer tube 5 is welded to a coupling member 2A, which is in turn mechanically coupled to a push-rod 2. The piston 18 shown in FIG. 2 is drivable in a vertical direction up or down by pressurized gas.

A cooling channel 7 extends axially in the interior of the control rod 1. When the control rod is in operation, a cooling gas enters through openings 8 in the upper end of the control rod 1 and leaves through slots 10 in the rounded lower end or tip 9 of the control rod, the effluent gas penetrating the gaps between the fuel elements, or reaction-spheres 11. It will be seen that the inner tube 4 is rigidly connected at its bottom end with the tip 9, while the upper end of the control rod 1 is freely movable in the coupling member 2A, because of the different thermal expansion between the outer tube 5 and the inner tube 4. A safety insert or security device generally indicated as 13 includes a guide rod 15 freely passing through collars 15A and 16. The guide rod 15 and the collars 15A and 16 can be so dimensioned that the safety device 13 is only bent when the deflection of the control rod 1 exceeds the inside radius of the inner tube 4 and the radius of the safety insert 13. The safety insert 13 is held axially in the coupling member 2A by an upset head 13A and in the tip 9 by a threaded nut 14 which is secured against loosening by a split pin 14A. The guide rod 15 and the collar 16 can be so dimensioned that neither different thermal expansions between the control rod 1 and the safety insert 13, nor elastic and permanent elongations of the tubes 4 and 5 before or during a rupture of the control rod 1 can lead to tensile stresses in the safety insert or security device 13.

Figure 4:
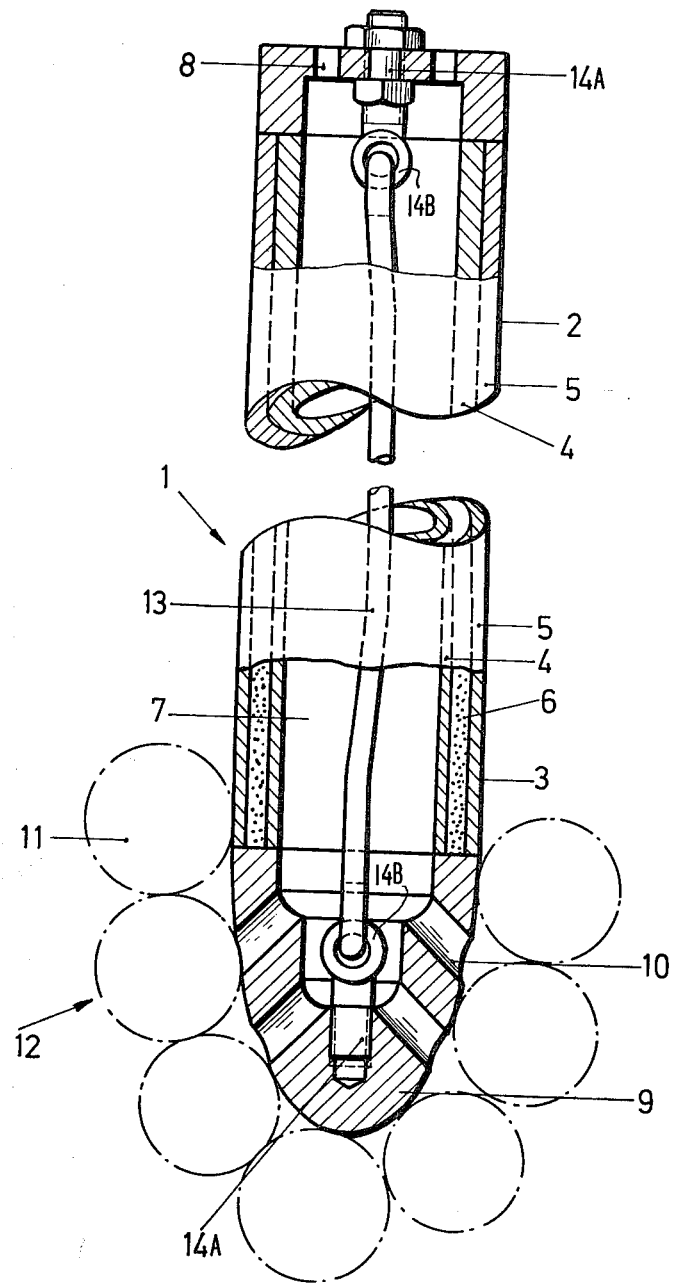
FIG. 4 shows an alternate form of implementation of the safety device in the control rod in partial longitudinal cross-section.

An alternate version of the control rod mechanism is shown in FIG. 4. The safety insert 13 will be seen to have the form of a normally slack cable, the opposite ends of the cable terminating via respective adapter pieces 14B in threaded bolts 14A which are attached to the control rod 1.

A cover 3 constitutes an outer shell for the control rod 1. The material of the cover 3 can become brittle during operation of the reactor as a result of neutron bombardment. The ensuing brittleness is due mainly to the formation of helium on the material itself, the causes function of either form of implementation being indistinguishable from the other.

What is claimed is:

1. In a gas-cooled pebble bed nuclear reactor, wherein the poison part of a control rod having upper and lower end portions and having an interior cooling fluid channel is movable into and away from a bed of spherical fuel elements, the improvement which comprises a control rod security device which, upon fracture of said control rod intermediate its end portions, facilitates removal of the fractured control rod from said reactor, said security device including an oblong member located and extending within said channel and being slack relative to said control rod, said oblong member having opposite ends, first means attached to said one of said opposite ends for preventing a fall of said oblong member into said lower portion, second means attached to the other of said opposite ends for preventing portions of said control rod from falling into said bed of fuel elements upon fracture of said control rod intermediate said end portions, said oblong member being sufficiently strong so as to hold said upper and lower end portions together upon fracture of said control rod whereby, upon fracture of said control rod intermediate its upper and lower portions, said upper and lower end portions remain interconnected through said security device.

2. The combination of claim 1 wherein said upper and lower portions have first and second guide collar means, respectively, for guiding said oblong member therein, said first means comprising first stop means for abutting against said first guide collar means for preventing the fall of said oblong member into said lower portion, said second means comprising second stop means for abutting against said second guide collar means upon fracture of said control rod intermediate its upper and lower portions.

3. The combination of claim 1, wherein said first and second means are fastening members attached to said opposite ends, respectively, and fastenable to said upper and lower end portions.

4. The combination of claim 1, wherein said oblong member is a slack cable.

5. The combination of claim 1, wherein at least one of said first and second means is detachably attached to one of said opposite ends.

6. The combination of claim 1, wherein said first and second means are welding connections attaching said opposite ends, respectively, to said upper and lower end portions.

7. The combination of claim 1, wherein said oblong member is a rod.

8. The combination of claim 1, wherein said oblong member is a tube.

* * * * *